United States Patent
Deng

(10) Patent No.: US 6,871,301 B1
(45) Date of Patent: Mar. 22, 2005

(54) APPARATUS AND METHOD FOR USING A 2-WIRE BUS TO DESKEW 4 XAUI LANES ACROSS MULTIPLE ASIC CHIPS

(75) Inventor: Yu Deng, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 361 days.

(21) Appl. No.: 10/053,761

(22) Filed: Jan. 22, 2002

(51) Int. Cl.⁷ .............................................. G11B 20/20
(52) U.S. Cl. ...................................................... 714/700
(58) Field of Search ................................ 714/700–701; 360/26; 326/41, 21, 62; 327/100, 141

(56) References Cited

U.S. PATENT DOCUMENTS 6,704,890 B1 * 3/2004 Carotti et al. ................ 714/700
6,750,675 B2 * 6/2004 Venkata et al. ................ 326/41

OTHER PUBLICATIONS

Wu et al., Design and verification of differential transmission lines, 2001, IEEE, p. 85–88.*
IEEE Draft P802.3ae/D4.0. Figure 48–8, Supplement to IEEE Std. 802.3, Dec. 6, 2001, IEEE.
TLK3104SA QUAD 3.125 Gbps Serial Transceiver, Texas Instruments product data sheet, pp. 1–19. Sep. 2001, Texas Instruments, POB 655303, Dallas, Tx 75265.

* cited by examiner

Primary Examiner—Shelly A. Chase
(74) Attorney, Agent, or Firm—Charles E. Krueger

(57) ABSTRACT

A two-wire bus is used to de-skew XAUI lanes of a single channel received at independent chips. One wire of the bus is transmits an alignment signal generated by a master and used by slaves coupled to the bus to detect misalignment of their data from data received at the master. The other wire transmits an error signal generated by any slave that detects a misalignment.

9 Claims, 3 Drawing Sheets

Fig. 1A

Fig. 1B

APPARATUS AND METHOD FOR USING A 2-WIRE BUS TO DESKEW 4 XAUI LANES ACROSS MULTIPLE ASIC CHIPS

BACKGROUND OF THE INVENTION

The XAUI (Ten Gigabit Attachment Unit Interface) is a 10 bps attachment interface unit for delivering 10 Gbps Ethernet speeds for chip-to-chip, board to board, and inter-box communications. The XAUI spec defines four 3.125-Gbps streams for a total of 12.5-bps, which, taking into account 8 B/10 B encoding overhead, supports a 10 gigabit throughput with a maximum skew of 40 UI (unit interval).

In a typical environment, 10-Gbps parallel data received on a wide parallel bus is serialized, 8 b/10 b encoded, and transmitted on the four 3.125-Gbps XAUI lanes. At the receiver the serial data is reformatted in parallel form for transmission on a parallel bus. If the routing of the four XAUI lanes is not closely matched then the data received on one lane will be skewed relative to data received on the other lanes. The XAUI spec provides for automatic deskewing of the lanes to eliminate the requirement of closely matching the routes for each lane. Skew is introduced between lanes by both active and passive elements of a XAUI link. The IEEE 802.3ae PCS deskew function compensates for all lane-to-lane skew observed at the receiver.

XAUI is a self-timed interface having the timing clock embedded within the data. The data stream includes an alignment character (/A/) that is detected by a synchronization unit and used to align the data on the different lanes to deskew the data. Typically, data from each XAUI lane is buffered by a FIFO. The repetition of the alignment character (/A/) on each serial channel allows the FIFOs to remove or add the required phase delay to align the /A/ on each lane thereby deskewing the data on each of the four XAUI lanes.

This alignment process is schematically depicted in FIGS. 1A and B. In FIG. 1A the received data on each of the four XAUI lanes are skewed relative to each other. In FIG. 2B the data has been realigned to that the /A/ character in each lane is in the same column.

For point to point connections, all the 4 serial lanes will end in the same chip, so that only a single PCS (Physical Coding Layer) deskew state machine, as defined in IEEE P802.3ae figure 48-8, is required to deskew the 4 XAUI lanes. This specification is hereby incorporated by reference for all purposes.

Implementation of 10 Gbps Ethernet requires NxN switch fabrics capable of switching 10 Gbps data streams. However, the implementation of an NxN 10 GE switch fabric (N>=64) as a single chip ASIC is either not feasible or just too expensive with present semiconductor fabrication methods because of the large number of ports. One solution is to implement the NxN 10 GE switch fabric as 4 NxN 2.5 G chips with each chip operating on a single XAUI lane thus reducing the clock data rate on each chip by a factor of four. However, this creates the problem of deskewing 4 XAUI lanes across 4 different ASIC chips.

BRIEF SUMMARY OF THE INVENTION

In one embodiment of the invention, a 2-wire bus links each of the NxN chips receiving a single XAUI lane to allow the deskewing of the data in the different chips. One of the chips is selected to be a master and asserts an alignment signal on a first wire of the bus when it detects an alignment character in the received serial data stream.

In another embodiment of the invention, each of the slave chips detects when the alignment character is received in the serial data received on its respective lane. The time of detection is compared to with the time of assertion of the alignment signal by the master to determine the skew of data at each slave with respect to the data received at the master.

In another embodiment of the invention, the internal clock speed of each NxN chip is twice the clock speed of 2-wire bus. The master generates an alignment signal that defines which phase of the 2-wire bus clock corresponds to the receipt of the alignment character.

In another embodiment of the invention, each slave asserts an error signal on a second wire of the 2-wire bus if it detects that it has received the alignment character on a different clock cycle than the master.

Other features and advantages of the invention will be apparent in view of following detailed description and appended drawings.

BRIEF DESCRIPTION OF THE DRAWINGS

FIGS. 1A and 1B are diagrams depicting the alignment of received data on different lanes;

DETAILED DESCRIPTION OF THE INVENTION

Figure 2:
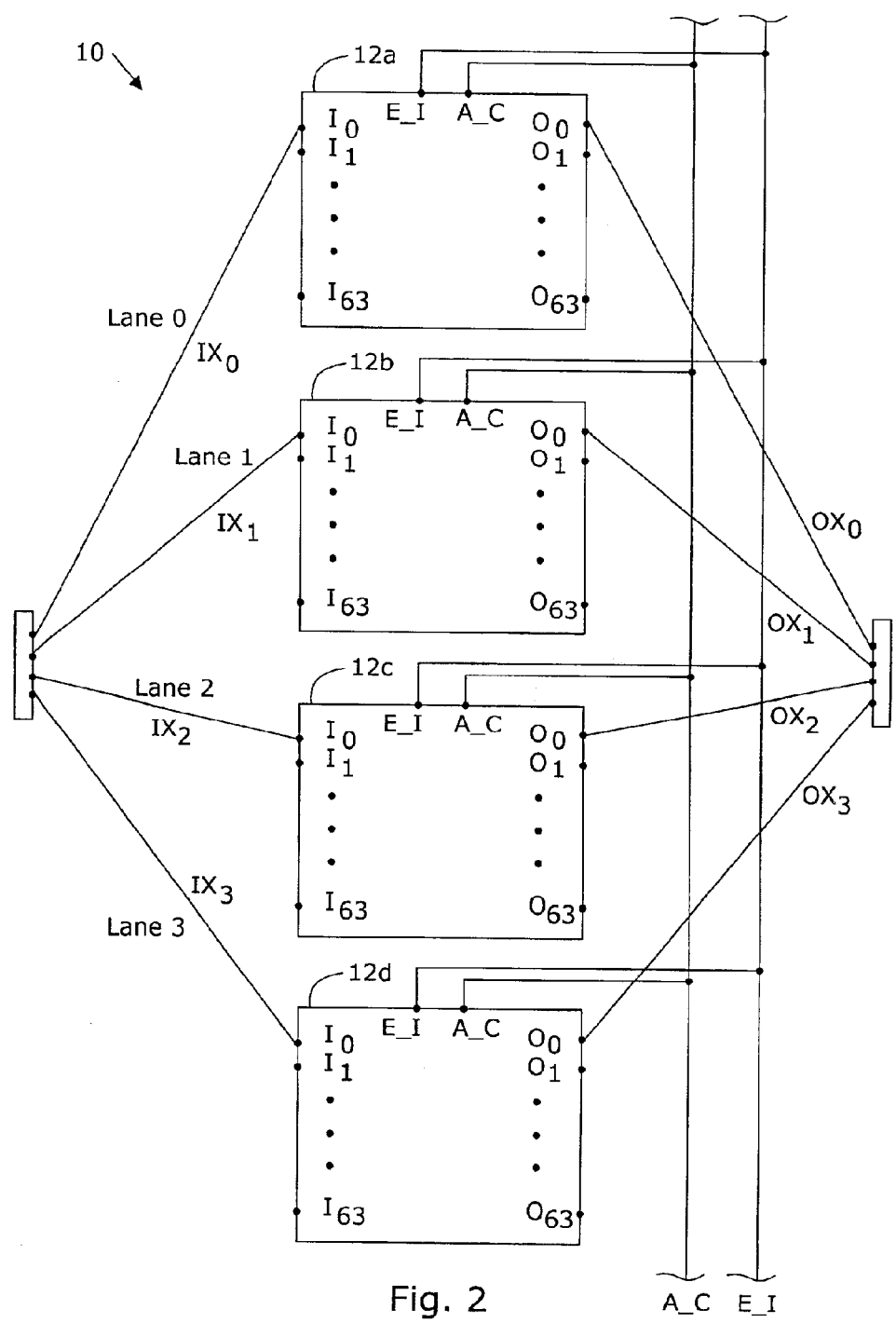
FIG. 2 is a block diagram of 4 NxN switch fabric chips connected to implement an NxN switch fabric.

The invention will now be described with reference to specific embodiments by way of example not limitation. In the drawings like or similar parts in different views have the same reference number. In the following an embodiment will be described which is utilized in an NxN switch fabric. However, it will be apparent that the invention has general utility in many other environments.

FIG. 2 depicts an NxN 10-Gbps switch fabric 10 implemented by four 2.5-Gbps NxN chips 12a–12d. As described above, each 10 Gbps channel is serialized and transmitted over 4 XAUI lanes. Looking at a first channel, the first input XAUI lane, $IX_0$, is coupled to the first input port, $I_0$, of the first switch fabric chip 12a. The second, third, and fourth input XAUI lanes, $IX_1$, $IX_2$, and $IX_3$, are coupled to the first input port, $I_0$, of the second, third, and fourth switch fabric chips 12b, c, and d respectively.

In general, each input channel has one of its four XAUI lanes coupled to a like-numbered port on each chip. Thus, the first input channel is coupled to input port $I_0$ on each of the four chips, the second input channel is coupled to input port $I_1$ one each of the four chips, and so on.

Similarly, looking at a first output channel, the first output XAUI lane, $OX_0$, is coupled to the first output port, $O_0$, of the first switch fabric chip 12a. The second, third, and fourth output XAUI lanes, $OX_1$, $OX_2$, and $OX_3$, of the first output channel are coupled to the first output port, $O_0$, of the second, third, and fourth switch fabric chips 12b, c, and d respectively.

Each switch fabric chip 12 can connect any input port to any output port. In the case of a 4-chip configuration, the controller switches the chips in tandem so that all 4 input XAUI lanes of a single input channel are switched to a single output channel. Thus, if the first input channel were to be switched to the first output channel port then port $I_0$ would be coupled to port $O_0$ on each switch fabric chip. In general, the four input XAUI lanes of any input channel can be coupled to the four output XAUI lanes of any output channel. Additionally, each port can be coupled to an input and output XAUI lane to provide full duplex switching.

Figures 1A, 1B:
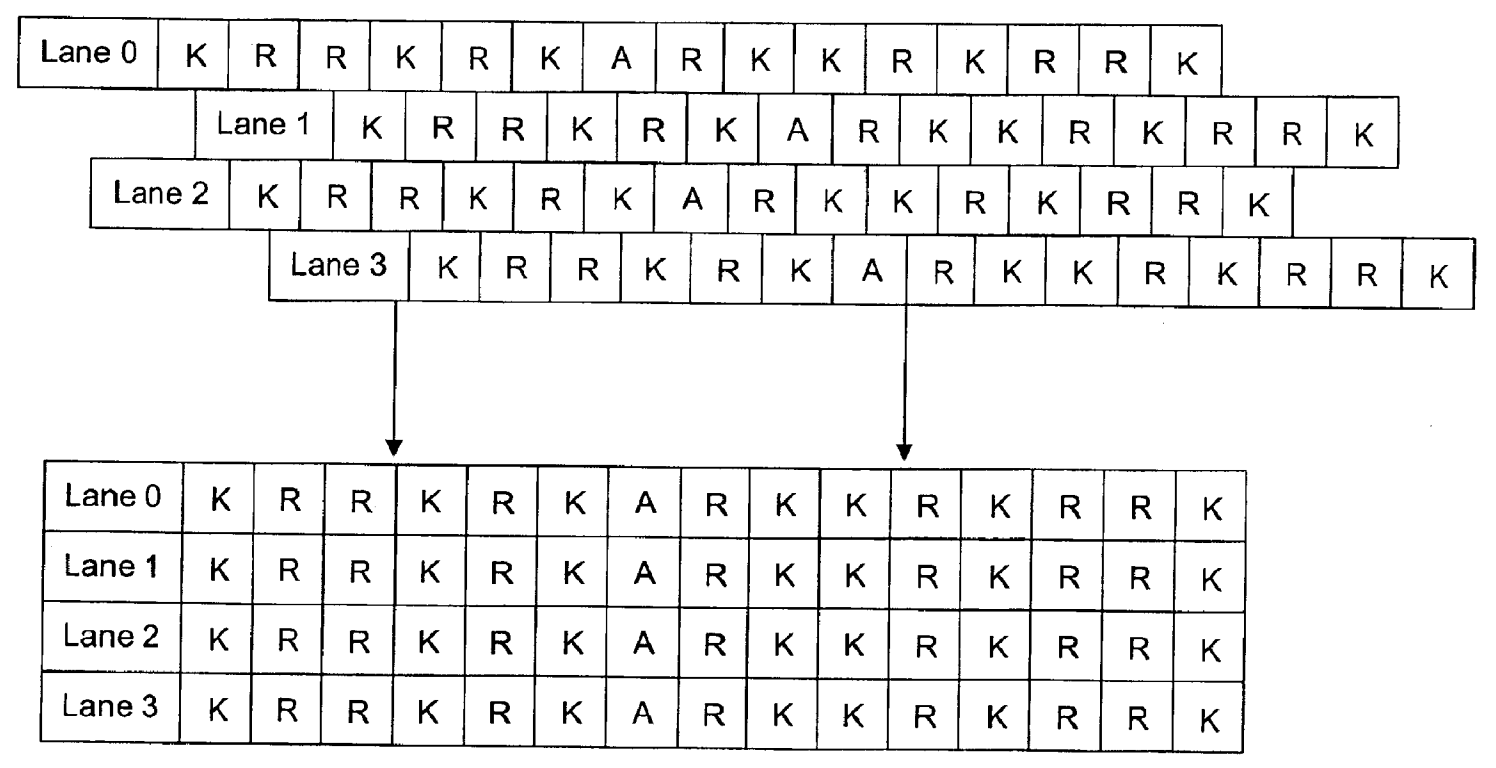

As described above, with reference to FIGS. 1A and B, the data transmitted in the XAUI lanes may be skewed. When the XAUI lanes are received in a single chip the standard deskew state machine, as defined in IEEE P802.3ae figure 48-8, is utilized to deskew the 4 XAUI lanes. However, in the present embodiment, the lanes are received at different chips so that a new method of deskewing needs to be implemented.

In the presently defined embodiment, a complete XAUI deskew state machine is included for each port on each of the four switch fabric chips. However, since each of the XAUI lanes of a single channel are received on a different chip there it is impossible for the deskew state machines to synchronize the data in the different XAUI lanes because the /A/ character in the different lanes are detected on different chips. A technique for allowing the XAUI deskew state machines on different chips to synchronize data on different XAUI lanes received on the different chips will now be described.

In the currently described embodiment, a 2 wire bus, implemented as traces on a printed circuit board (PCB), is used to communicate deskewing information between the separate chips coupled to the XAUI lanes. The 2 wires of the bus are: Align_Char (A_C): Bi-directional I/O with Output_Enable, and Error_Ind (E_I): Bi-Directional I/O with Output_Enable.

Figure 3:
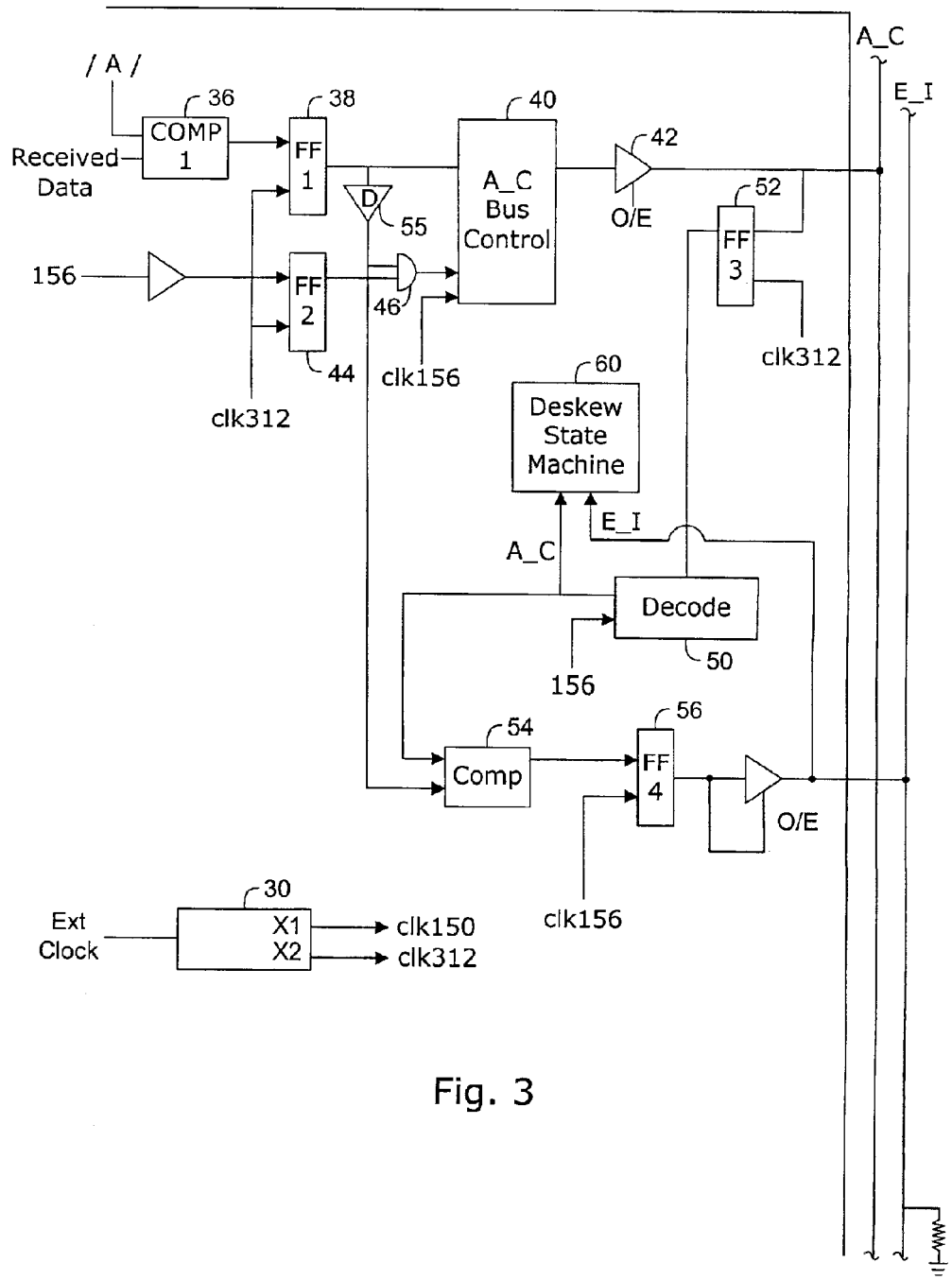
FIG. 3 is a block diagram of an embodiment of the invention.

FIG. 3 is a block diagram of the functional units included in each of the switch fabric chips 12. Each chip includes a clock generator that receives a 156.25 Mhz external reference clock. The traces to each chip are of the same length the external clock signals received at each chip are in phase. The clock generator includes a phase-locked loop (PLL) 30 that generates an in-phase bus clock signal (clock156=156.25 Mhz) and an internal chip clock signal (clock312=312.5 Mhz). The bus clock runs at a slower speed than the chip clock due to the physical characteristics of the PCB.

The incoming data is compared to the /A/ character in a detector block 32 including a first comparator 36 and a first flip-flop 38 having its output connected to the trigger input of a bus driver control unit 40. The first flip-flop is clocked by the internal chip clock and asserts an /A/ detection signal at its output when /A/ is detected in the received data stream. The output of the bus driver control unit is coupled to the A_C bus wire via an output driver 42 including an output enable (O/E) input.

A phase detection block includes a second flip-flop 44, clocked by the internal chip clock and having a delayed bus clock as its input, and a first AND gate 46. The outputs of the first and second flip-flops 38 and 44 are connected to the first AND gate 46 which has a phase indicating signal as its output. The phase indicating signal is coupled to phase input of the bus driver control unit 40.

Each chip also has an E_I signal generator that includes an A_C decoder 50 having a signal input coupled to the A_C bus wire via a third flip-flop 52, clocked by the internal bus, a clock input receiving the bus clock, and an output for generating a timing signal. The E_I signal generator also includes a second comparator 54 having a first input coupled to receive the on chip /A/ character signal detection signal with exactly via matched pipe-line delay element 55, for compensating the delays introduced into the received A_C signal, and a second input coupled to receive the timing signal from the decoder. The output of the second comparator is coupled to the E_I wire of the two wire bus via a fourth flip-flop 56 and an output driver 58. The output of flip-flop 56 is connected to both the input and output/enable of the output driver 58, so that it will drive E_I active only when error is detected, otherwise it will tri-state E_I.

As described above, each chip includes a deskew state machine 60 coupled to receive A_C and the E_I signal from the two-wire bus.

The operation of the system will now be described. Turning first to the generation of the A_C signal. One of the chips, for example the first chip 12a, functions as a master and asserts the A_C signal on the A_C wire of the two wire bus when it detects the /A/ character in its received data stream. The O/E input of the A_C bus driver 42 is set high during configuration. The remaining chips have their O/E disabled and function as slaves. The slaves adjust their data streams so that the /A/ character is aligned at each chip (as depicted in FIG. 1).

The A_C signal is driven high, on the master chip 12a, when the first comparator 36 asserts its output signal indicating that the /A/ character has been detected in the received data stream. This output is synchronized to the internal clock by the first flip-flop 38. Thus the output of the first-flip 38 occurs during a detection internal clock cycle that indicates when the /A/ character was detected on the master chip 12a.

Since the bus is sampled only once every two internal chip cycles, information regarding the phase of the bus clock corresponding to the detection internal chip cycle is encoded onto the A_C bus line. In this embodiment, the second flip-flop 44 outputs the phase of the bus clock for each chip clock cycle. If /A/ is detected when the phase of the bus clock signal is high then the output of the first AND gate (the phase signal) is high at the time of detection and if /A/ is detected when the phase of the bus clock signal is low then the AND gate output is low at the time of detection. The bus driver control unit drives asserts A_C for one bus clock cycle if /A/ is detected when the bus clock phase is low or for two bus clock cycles if /A/ is detected when the bus clock phase is high.

The detection of the A_C signal at a slave chip will now be described. The A_C bus wire is coupled to the A_C decoder 50 by the third flip-flop 52 that synchronizes the A_C signal to the internal chip clock. The A_C decoder 50 generates an A_C synch signal corresponding to the phase of the bus clock signal encoded onto the A_C bus signal.

The generation of the E_I signal at a slave chip will now be described. The second comparator 54 generates an error indicating signal if the generated A_C synch signal and on-chip generated /A/ detection signal are mismatched. This error indicating signal is input to the E_I bus driver to drive the E_I bus high when error is detected, otherwise it will tri-state its E_I bus driver. The Error_Ind bus has a pull-down resistor connect to GND on PCB. Thus, multiple chips can drive the bus if mismatches are detected.

Thus, each slave chip 12b to 12d that detects a mismatch will drive its Error_Ind pin active for one bus clock cycle. For slave chips with no mismatch, the Error_Ind pin is tri-stated. The PCS deskew state machines (IEEE P802.3ae figure 48-8) 60 in all 4 chips will use the same Error_Ind input as their "deskew_error" input, by doing it this way, the deskew state machine in all 4 chips will be always in the same state. And Finally, all the 4 chips will align with lane 0.

Each chip supplies its decoded A_C signal and received E_I signal to its deskew state machine 60 to provide the timing required for the deskew state machines to align the data streams on all chips four chips 12a–d.

This embodiment of the invention has the advantages of using the smallest number of pins for inter-chip connections, reducing the chip package size (cost and PCB real estate), and facilitating easier PCB routing. Additionally, the system is simple and standard compatible. Only a single IEEE P802.3ae figure 48-8 PCS deskew state machine is needed for each port. Further, the system is symmetric. In can be utilized with an NxN 10 GE switch fabric with 4 chips, an N/2×N/2 10 GE switch fabric with 2 chips, or an N/4×N/4 10 GE switch fabric with 1 chip by using exactly the same deskew scheme.

The invention has now been described with reference to the preferred embodiments. Alternatives and substitutions will now be apparent to persons of ordinary skill in the art. For example, the particular synchronization and logic elements are exemplary and various other substitute techniques known in the art can be utilized. Accordingly, it is not intended to limit the invention except as provided by the appended claims.

What is claimed is:

1. A system for deskewing serial data received at a plurality of independent devices, each device coupled to receive a single serial XAUI lane, with a Master device coupled to a selected XAUI lane and slave devices coupled to remaining XAUI lanes, the system comprising:
   a two-wire bus, having a first wire and a second wire;
   an alignment character detecting unit included in each device, with the alignment character detecting unit for indicating when an alignment character is detected in serial data received at the device;
   an Align_Character signal assertion unit, included in the Master device, and coupled to the alignment character detecting unit and to the first wire, for asserting the Align_Character signal when an alignment character is detected in serial data received from the selected XAUI lane; and
   a deskew unit in each slave device, coupled to the first wire, the second wire, and to the alignment character detecting unit, for decoding the Align_Char signal to determine whether its received data is skewed relative to data received at the master, and if the data is skewed, slipping its datapath to deskew the data and asserting an Error_Ind signal on the second wire.

2. The system of claim 1 wherein each device runs on an internal device clock at twice the speed of the bus clock and with the internal device clock and bus clock being in phase and with a bus clock cycle comprising a first phase aligned with a first device clock cycle and a second phase aligned with a second device clock cycle, the system further comprising:
   an Align_Character signal encoder for asserting the Align_Character signal for one bus cycle if the alignment character is detected during the first device clock cycle and for asserting the Align_Character signal for two bus cycles if the alignment character is detected during the second device clock cycle.

3. A system for deskewing serial data received at a plurality of independent devices, each device for being coupled to receive a single serial XAUI lane, each device including:
   an Align_Char port and an Error_Ind port;
   an alignment character detecting unit, with the alignment character detecting unit for indicating when an alignment character is detected in serial data received at the device;
   an Align_Character signal assertion unit, coupled to the alignment character detecting unit and to the Align_Char output port, for asserting the Align_Character signal at the Align_Character port when an alignment character is detected in serial data received from the single XAUI lane and the Align_Character is output enabled;
   a deskew unit, coupled to the Align_Character port, the Error_Ind port, and to the alignment character detecting unit, for decoding an Align_Char signal received at the Align_Character port to determine whether its received data is skewed relative to data received at a device asserting the Align_Character signal, and if the data is skewed, slipping its datapath to deskew the data and asserting an Error_Ind signal at the Error_Ind port.

4. A method for deskewing serial data received at a plurality of independent devices, each device for being coupled to receive a single serial XAUI lane, the method including the acts of:
   at a Master device coupled to the selected XAUI lane:
      asserting an Align_Char signal during a first bus clock cycle when the alignment character is detected;
   at a Slave device coupled to another XAUI lane:
      receiving the Align_Char signal during the first bus clock signal;
      determining whether its received data is skewed relative to the data received at the Master device;
      if the data is skewed:
         slipping its datapath to align its received data with master; and
         asserting an Error_Ind signal.

5. A system for deskewing serial data received at a plurality of independent devices, each device for being coupled to receive a single serial XAUI lane, the system comprising:
   at a Master device coupled to the selected XAUI lane:
      means for asserting an Align_Char signal during a first bus clock cycle when the alignment character is detected;
   at a Slave device coupled to another XAUI lane:
      means for receiving the Align_Char signal during the first bus clock signal;
      means for determining whether its received data is skewed relative to the data received at the Master device;
      means for slipping its datapath to align its received data with master if the data is skewed; and
   means for asserting an Error_Ind signal if the data is skewed.

6. A method for deskewing serial data received at a plurality of independent devices, each device for being coupled to receive a single serial XAUI lane, the method including the acts, performed at a device, of:
   asserting an Align_Char signal during a first bus clock cycle when the alignment character is detected;
   receiving and decoding an Align_Char signal received at the Align_Character port;
   determining whether its received data is skewed relative to data received at a device asserting the Align_Character signal;
   if the data is skewed:
      slipping its datapath to align its received data with master; and
      asserting an Error_Ind signal.

7. The method of claim 6, with a device including a deskew state machine, the method further comprising the acts of:

if an Error_Ind signal is received:
resetting the deskew state machine so that all deskew state machines on each device are synchronized.

8. A system for deskewing serial data received at a plurality of independent devices, each device for being coupled to receive a single serial XAUI lane and with each device including an Align_Char port and an Error_Ind port, with a device comprising means for asserting an Align_Char signal when the alignment character is detected;

means for receiving and decoding an Align_Char signal received at the Align_Character port;

means for determining whether its received data is skewed relative to data received at a device asserting the Align_Character signal;

means for slipping its datapath to align its received data with master if the data is skewed; and means for asserting an Error_Ind signal at the Error_Ind port if the data is skewed.

9. The system of claim 8, with a device including a deskew state machine, the device further comprising:

means for resetting the deskew state machine so that all deskew state machines on each device are synchronized if an Error_Ind signal is received the Error_Ind port.

* * * * *